US012025693B2

United States Patent
Musgrove et al.

(10) Patent No.: US 12,025,693 B2
(45) Date of Patent: Jul. 2, 2024

(54) METHOD FOR CORRECTING A SYNTHETIC APERTURE RADAR ANTENNA BEAM IMAGE

(71) Applicants: Cameron Musgrove, Bixby, OK (US); Griffin Gothard, Satellite Beach, FL (US); Daniel Faircloth, Huntsville, AL (US)

(72) Inventors: Cameron Musgrove, Bixby, OK (US); Griffin Gothard, Satellite Beach, FL (US); Daniel Faircloth, Huntsville, AL (US)

(73) Assignee: IERUS TECHNOLOGIES, INC., Huntsville, AL (US)

( * ) Notice: Subject to any disclaimer, the term of this patent is extended or adjusted under 35 U.S.C. 154(b) by 400 days.

(21) Appl. No.: 17/515,733

(22) Filed: Nov. 1, 2021

(65) Prior Publication Data

US 2023/0135348 A1 May 4, 2023

(51) Int. Cl.
*G01S 13/90* (2006.01)
*G06T 5/10* (2006.01)
(Continued)

(52) U.S. Cl.
CPC .......... *G01S 13/9021* (2019.05); *G06T 5/10* (2013.01); *G06T 5/50* (2013.01); *G06T 5/70* (2024.01); *G06T 2207/10044* (2013.01)

(58) Field of Classification Search
CPC .... G01S 13/9021; G01S 7/4026; G01S 13/90; G06T 5/10; G06T 5/50; G06T 5/70; G06T 2207/10044
See application file for complete search history.

(56) References Cited

U.S. PATENT DOCUMENTS 7,532,150 B1  5/2009  Abatzoglou et al.
8,344,934 B2  1/2013  Ryland
(Continued)

FOREIGN PATENT DOCUMENTS

CN  104330796 A  *  2/2015  ......... G01S 13/9017
CN  112444783 A  *  3/2021
(Continued)

OTHER PUBLICATIONS

Boag, "A fast multilevel domain decomposition algorithm for radar imaging," in IEEE Transactions on Antennas and Propagation, vol. 49, No. 4, pp. 666-671, Apr. 2001, doi: 10.1109/8.923329 (Year: 2001).*

(Continued)

*Primary Examiner* — Emily C Terrell
*Assistant Examiner* — Julia Z. Yao
(74) *Attorney, Agent, or Firm* — Lanier Ford Shaver & Payne, PC; Gerald M. Walsh (57) ABSTRACT

A method for correcting a synthetic aperture radar (SAR) antenna beam image comprising: collecting SAR data, forming an uncorrected image, isolating a pixel value from the uncorrected image, performing an inverse image formation on the isolated pixel value to convert the isolated pixel value into a phase history, calculating actual isolated pixel value location in the uncorrected image, computing range loss, antenna beam, and phase corrections for the isolated pixel value, interpolating range loss corrections, antenna beam pattern corrections, and phase corrections in the phase history, applying the interpolated corrections to the isolated pixel value phase history thereby forming a corrected phase history, converting the corrected phase history back into a corrected image, replacing the corresponding uncorrected pixel value in the uncorrected image with the corrected isolated pixel value, and repeating this process for all (Continued)

uncorrected pixel values thereby providing a corrected SAR image.

20 Claims, 5 Drawing Sheets

(51) Int. Cl.
  *G06T 5/50* (2006.01)
  *G06T 5/70* (2024.01)

(56) References Cited

U.S. PATENT DOCUMENTS

| | | | |
|---|---|---|---|
| 10,107,895 | B2 | 10/2018 | Cho et al. |
| 10,330,786 | B1* | 6/2019 | Musgrove ............... G01S 7/023 |
| 10,495,750 | B1* | 12/2019 | Musgrove ............. G01S 13/904 |
| 10,845,461 | B2 | 11/2020 | Phelan et al. |
| 11,144,794 | B2* | 10/2021 | Lee ..................... G06F 18/2431 |
| 11,361,398 | B2* | 6/2022 | Lee ......................... G06F 18/23 |
| 2007/0164894 | A1* | 7/2007 | Sherman ............. G01S 13/9011 |
| | | | 342/25 F |
| 2008/0042893 | A1* | 2/2008 | Connell ............. G01S 13/9019 |
| | | | 342/25 F |
| 2012/0032677 | A1* | 2/2012 | Dannels ............. G01R 33/5659 |
| | | | 324/309 |
| 2013/0129253 | A1* | 5/2013 | Moate ..................... G06T 3/147 |
| | | | 382/278 |
| 2023/0326057 | A1* | 10/2023 | Blanche .................... G06T 5/70 |
| | | | 382/108 |

FOREIGN PATENT DOCUMENTS

| | | | | |
|---|---|---|---|---|
| JP | 2015141124 A | * | 8/2015 | |
| WO | WO-2008115175 A1 | * | 9/2008 | ......... G01S 13/9035 |

OTHER PUBLICATIONS

Zhao et al., "A Temporal Phase Coherence Estimation Algorithm and Its Application on DInSAR Pixel Selection," in IEEE Transactions on Geoscience and Remote Sensing, vol. 57, No. 11, pp. 8350-8361, Nov. 2019, doi: 10.1109/TGRS.2019.2920536. (Year: 2019).*

Li et al., "A method to improve the accuracy of SAR image change detection by using an image enhancement method," ISPRS Journal of Photogrammetry and Remote Sensing, vol. 163, May 2020, pp. 137-151 (Year: 2020).*

Onhon et al., "A Sparsity-Driven Approach for Joint SAR Imaging and Phase Error Correction," in IEEE Transactions on Image Processing, vol. 21, No. 4, pp. 2075-2088, Apr. 2012, doi: 10.1109/TIP.2011.2179056. (Year: 2012).*

Yue et al., "Synthetic Aperture Radar Image Statistical Modeling: Part One-Single-Pixel Statistical Models," in IEEE Geoscience and Remote Sensing Magazine, vol. 9, No. 1, pp. 82-114, Mar. 2021, doi: 10.1109/MGRS.2020.3004508. (Year: 2021).*

* cited by examiner

METHOD FOR CORRECTING A SYNTHETIC APERTURE RADAR ANTENNA BEAM IMAGE

FIELD OF THE INVENTION

This invention relates generally to methods for correcting radar antenna beam patterns and, more particularly, to a method for correcting synthetic aperture radar (SAR) antenna beam patterns.

BACKGROUND OF THE INVENTION

Synthetic Aperture Radar (SAR) is a type of radar that uses the relative motion between a target and a sensor to produce high resolution images of that target. This relative motion can include a stationary target and a moving antenna or a moving target and a stationary antenna. A moving target and a stationary antenna are referred to as inverse synthetic aperture radar (ISAR). The distance the SAR device travels over a target in the time taken for the radar pulses to return to the antenna creates a synthetic antenna aperture with finer resolution than the real beam aperture of the antenna. To create a SAR image, successive pulses of radio waves are transmitted to "illuminate" a target scene, and the echo of each pulse is received and recorded. The pulses are transmitted and the echoes received using a single beam-forming antenna, with wavelengths of a meter down to several millimeters. As a SAR device on board a platform moves, the antenna location relative to the target changes with time. Signal processing of the successive recorded radar echoes allows the combining of the recordings from these multiple antenna positions. This process forms a synthetic antenna aperture and allows the creation of high-resolution images.

One of the challenges of increasing an imaging radar system's instantaneous radio frequency (RF) bandwidth is maintaining a constant antenna beam pattern. For a fixed physical aperture area of an antenna, by definition, the directivity, and pattern, varies as a function of frequency. The pattern changes are significant for close range instrumentation radars that accurately measure the radar cross section (RCS) of objects from 2-18 GHz.

When collecting data in an ISAR collection mode, where the radar is stationary and the object is rotated as measurements are collected, the beam pattern effects can be calibrated with a reference measurement of a known object beforehand. This approach increases cost as the object to be measured increases in size. In some cases, a large, specialized facility is necessary to rotate the object. Forward operating areas with less infrastructure have need for a cost-effective instrumentation radar to scan an area of an aircraft, for example, to evaluate if maintenance is needed for its radar reducing features. For this case the radar needs to move, not the object, to locate and measure RCS.

Existing beam pattern correction methods that approximate the beam pattern as a polynomial cannot compensate for frequency variances observed and they assume the target response is present in all frequencies and all measurement locations. Frequency dependent pattern corrections have been developed for range migration processing over a 2 GHz bandwidth. Many radar systems use a uniform clutter field to estimate an antenna pattern but that requires both a uniform clutter field and a constant gain over frequency, which may be difficult to obtain or maintain. At present, there is no satisfactory method or system that addresses the wide range of frequency or the wide range of angles that occur with an instrumentation radar.

SUMMARY OF THE INVENTION

The present invention provides a method for correcting a synthetic aperture radar (SAR) image by collecting SAR data, including phase history and wave number domain, from an object, forming an uncorrected image $I_{uc}$ of the object from the SAR collected data using an invertible image formation algorithm, isolating a pixel value $I_{uc}$ (x,y) from the uncorrected image $I_{uc}$, then inserting that value into another image, $I''_{uc}$, the same size as $I_{uc}$ with zero values for all other pixels, performing an inverse image formation on the image $I''_{uc}$, and converting the image into a phase history $X''_v$ that represents only the isolated pixel value $I_{uc}$ (x,y). The relative location of the isolated pixel value $I_{uc}$ (x,y) is calculated between every radar measurement point to the actual isolated pixel's location $S_x' S_y'$.

Range loss corrections are computed for the isolated pixel value $I_{uc}$ (x,y), based on the distance to the actual pixel value location $S_x' S_y'$. Antenna beam pattern corrections for the isolated pixel value $I_{uc}$ (x,y) are computed based on frequency and angle to a measurement location at every SAR sampling position. Phase corrections for the isolated pixel value $I_{uc}$ (x,y) are calculated using an image formation algorithm. Range loss corrections, antenna beam pattern corrections, and phase corrections are interpolated in a phase history domain as $X''_{corr}$, according to the image formation algorithm. The interpolated phase history $X''_{corr}$ is applied to the phase history $X''_v$ forming a corrected phase history $X'''_v$.

The corrected phase history $X'''_v$ is converted back into an image $I''_c$. The corresponding uncorrected pixel value $I_{uc}$ (x,y) in the uncorrected image $I_{uc}$ is replaced with the corrected isolated pixel value $I''_c(x,y)$. The above steps are repeated for each uncorrected pixel value until all uncorrected pixel values in the uncorrected image $I_{uc}$ are replaced with corrected pixels values from $I''_c$, thereby providing a corrected SAR image of the object.

An advantage of the present invention is the ability to rapidly make corrections to a radar image to bring a radar cross-section image measurement closer to true radar cross-section.

Another advantage is the ability to use any invertible image formation algorithm to form an uncorrected image and to use that image formation algorithm to calculate corrections.

DETAILED DESCRIPTION OF THE INVENTION

While the following description details the preferred embodiments of the present invention, it is to be understood that the invention is not limited in its application to the details of arrangement of the parts as described and shown in the figures disclosed herein, since the invention is capable of other embodiments and of being practiced in various ways.

The present invention provides a method for implementing a frequency and spatially variant beam pattern correction for an instrumentation radar in a strip map SAR collection mode, wherein the correction relies solely upon the measured antenna patterns and not upon any particular image content to correct the image. The steps of the method are illustrated in the flow chart of FIG. 1. SAR image data is collected from an object using a synthetic aperture radar (SAR) (Step 1). The object can be stationary or moving. SAR data may be collected in a strip map SAR mode (Step 2) or into polar format (Step 3). If the SAR data is collected into a strip map SAR mode, the strip map SAR mode data may be converted into spotlight format data (Step 4). Methods for strip map data collections are well known in the art. Strip map mode collects data in a constant distance between pulses while the radar antenna is fixed at a particular angle relative to the radar's motion. Methods of spotlight data collection modes are well known in the art. Spotlight mode collects data at constant angle increments relative to a defined point in space and steers the antenna at that defined point in space. Strip map data is converted to spotlight format by methods known in the art where each collected pulse is shifted in time such that it is as if the radar flew a circle around a defined point. The defined point in space is defined for ease to be the center of the final image and can correspond to the center of a collection rail SAR. The specific method to make this correction depends upon the waveform used to collect SAR data.

Figure 1:
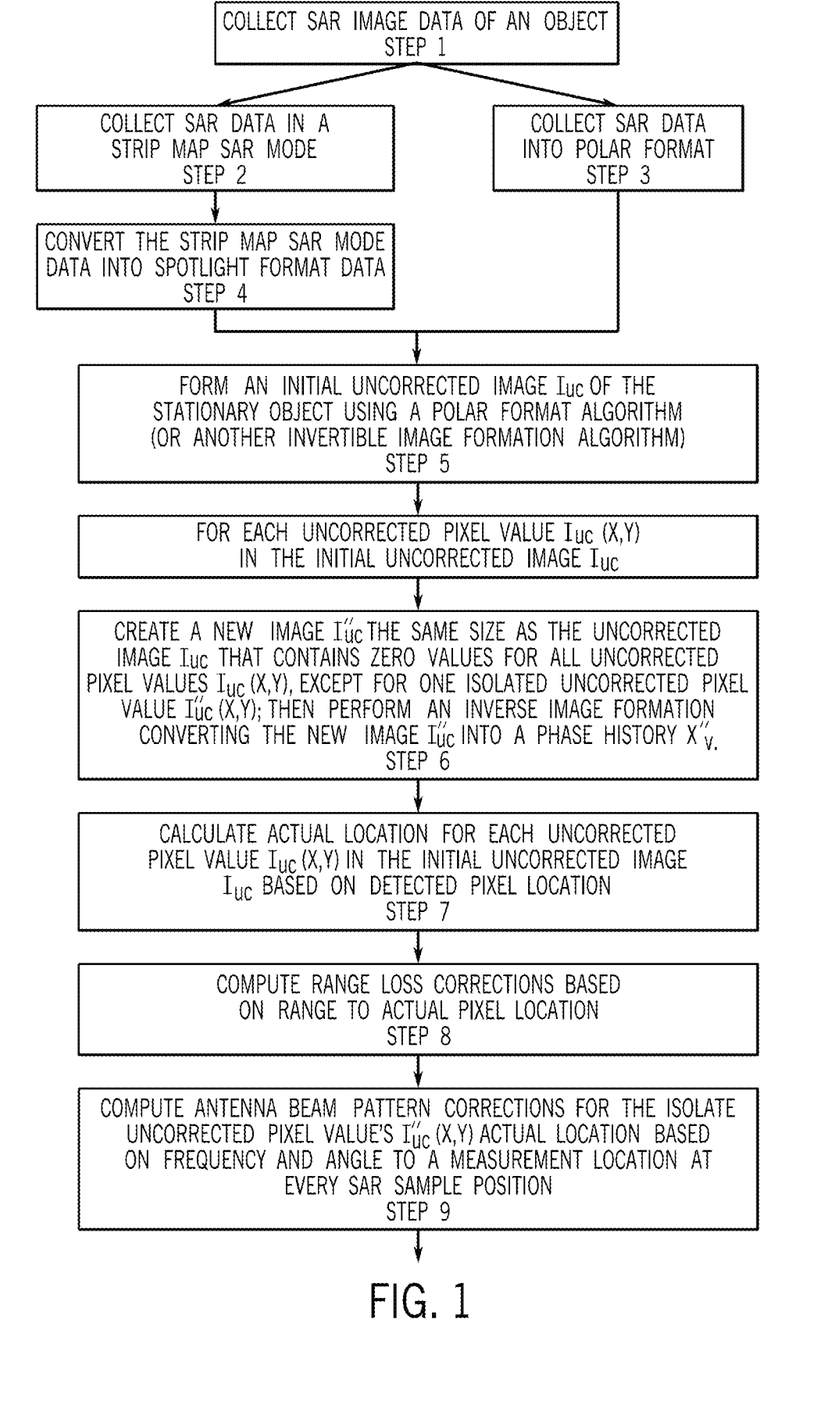
FIG. 1 is a flow chart of the steps of the method of the present invention.

For linear frequency modulated waveforms (only), the method includes defining a value, R_line, of the distance between the center of the image/target area and the position of the radar at the center of the collection rail SAR. The method further includes defining a vector, R_point, of the distance between the center of the image/target area to the location of the radar for each pulse collected. The range difference, defined as delR=R_line−R_point is then calculated and the following correction is applied on a pulse-by-pulse basis as the range difference changes for each pulse:

$$X'_v = X_v \exp\left(j\frac{2}{c}(2\pi f_c + \gamma)\Delta R\right)\exp\left(j\frac{2\gamma}{c^2}\Delta R^2\right),$$

where $X_v$ is the stripmap formatted phase history data and $X_v'$ is the spotlight formatted phase history data.

An initial uncorrected image $I_{uc}$ of the object is formed using a polar format algorithm (or another invertible image formation algorithm) (Step 5). A beam correction is applied using any invertible image formation algorithm. The polar format algorithm is used as an example. Invertible means that the image and collected data (i.e. phase history) can be transformed back and forth between the image and data domains. The transformation between image and phase history is a forward or reverse transformation.

The forward transformation converts phase history to an image. The reverse transformation converts the image to a phase history. An expression to describe the forward transformation from the phase history, $X'_v$, to an uncorrected image, is $I_{uc} = \mathcal{T}\{X'_v\}$.

Steps 6-14 are performed for each uncorrected pixel value $I_{uc}$ (x,y) in the initial uncorrected image $I_{uc}$. A new image, $I''_{uc}$, is created the same size as $I_{uc}$ that contains all zero values except for the isolated pixel from the uncorrected image $I_{uc}$ an inverse image formation is then performed, converting the isolated pixel value $I''_{uc}$, into a phase history $X''_v$. (Step 6). This step 6 can be implemented in a loop for every image pixel in $I_{uc}$. Other implementations include processing all image pixels at the same time, in parallel. The steps for each pixel in the uncorrected image are: selecting a pixel, zero valuing the remainder of the image pixels, and creating a single pixel value image, $I''_{uc}$, of the same size as the uncorrected image, $I_{uc}$. Then reverse transform image $I''_{uc}$, into a phase history, $X''_v$, that represents only that pixel location:

$$X''_v = \mathcal{T}^{-1}\{I''_{uc}\}.$$

The actual location for each pixel is calculated in the uncorrected image based on detected pixel location (Step 7). The pixel location is relative to a reference point. The reference point can be defined anywhere. It is convenient to define the center of the image as the reference point. The pixel location is calculated as the number of pixels from the reference point, then multiplied by the pixel spacing. The pixel location relative to the reference point is now known.

In many image formation algorithms, and depending on how the data are collected, the image pixel location $(S_x, S_y)$ is distorted from its true spatial location due to the radar's wavefront curvature (See Doerry, A W, "Wavefront curvature limitations and compensation to polar format processing for synthetic aperture radar images," SAND2007-0046, 902879, January 2006. doi: 10.2172/902879, which is incorporated herein by reference). Step 7 estimates the actual spatial position $(S_x', S_y')$ of that pixel location. Specifically, for the polar format algorithm at a close-range radar system, the true pixel location is a linear transform that requires calculating $\Delta r$ and $\alpha$. The distance from the radar data collection locations to the reference point (in this case the center of the image) is $R_{point}$, $$\alpha = \tan^{-1}\left(\frac{s_x}{R_{point}(midAperture)}\right)$$

where $R_{point}$(midAperture) is the closest distance, the radar approaches the reference point (this calculation assumes that the image is being formed at this location and orientation):

$$\Delta r = (R_{point}(midAperture) + s_y) * \left(\frac{1}{\cos(\alpha)} - 1\right),$$

the actual pixel location is then calculated $(s'_x, s'_y)$ as:

$$s'_y = s_y - \Delta r$$

$$s'_x = \tan(\alpha) * (R_{point}(midAperture) + s_y).$$

The range loss corrections are computed based on range to actual pixel location (Step 8). Range loss is calculated using a radar range equation, based on the Friis transmission equation (en.wikipedia.org/wiki/Friis_transmission_equation). In the radar range equation, range loss is a term in the dominator, to the fourth power. The radar collects data based on the range to scene center. When the scene size is large relative to the distance to the radar, the $R^4$ varies significantly over the entire scene. The assumed range used thus far in processing needs to be removed before the actual range to this pixel location is used to adjust the received power level.

Fundamentally, targets that are closer in range return more power than the radar expects. This correction will adjust this difference.

The range loss correction is made on a pulse-by-pulse basis. For each position of the radar collected data, the distance to the reference point is calculated as $Rng_{ref}$. Since the distance between the actual pixel location $(s'_x, s'_y)$ and each position the radar collected data is calculated as $Rng_{target}$, the correction factor for range loss can be calculated as $$Rng_{fac} = \sqrt{\frac{Rng_{ref}^4}{Rng_{target}^4}}$$

Antenna beam pattern corrections are computed as a matrix based on frequency and angle to a measurement location at every sample position (Step 9). Antenna beam pattern corrections are computed as a matrix based on frequency and angle between target true location and all radar measurement locations. Some radars use the same antenna for both transmit and receive. One method to calculate this angle is to first define a normal vector that represents the relative position to the radar measurement locations and pointing direction of the transmit and receive antenna(s). The radar measurement positions are then used with the relative antenna location to calculate an absolute location for each transmit and receive antenna at all radar measurement locations. Another vector from the transmit and receive antenna to the actual pixel location is calculated. The angle between these two vectors is then calculated. A dot product is one way to compute the angle between the two vectors. The computed angle at each location is then used to interpolate the antenna gain from a stored set of antenna pattern measurement data; this antenna gain is $G_{Tx}$ and $G_{Rx}$.

Antenna pattern measurement data will have two dimensions to express antenna gain: angle and frequency. Antenna pattern angle and frequency data can be measured independently of the radar system to characterize the antennas. The frequency points from the antenna pattern measurement data can be interpolated to match the same frequency support points and span as the phase history data.

An antenna gain factor correction, $Amp_{fac}$, is calculated and applied on a per-pulse basis. Each pulse has a unique angle from the antenna to the true pixel location (calculated as described in the above paragraph). The collected data may or may not be calibrated to a specific RCS value at a specific location. In the case the data has been calibrated, the calibration needs to be removed before applying this antenna correction. The antenna gain is calculated in the same way as it is calculated for the true pixel location, except the reference point is used instead of the true pixel location, which is $G_{refTx}$ and $G_{refRx}$.

$$Amp_{fac} = \frac{G_{Tx}G_{Rx}}{G_{refTx}G_{refRx}}$$

Phase corrections are calculated based on a suitable image formation algorithm known in the art (Step 10). For an example, see Doerry, "Wavefront Curvature Limitations and Compensation to Polar Format Processing for Synthetic Aperture Radar Images", page 12, equations 114-124. The phase corrections are expressed as $Phase_{fac}$.

Range loss corrections, antenna beam pattern corrections, and phase corrections are interpolated in the wave number domain according to the image formation method (Step 11). The phase corrections are calculated in the phase history domain based on the radar position as data is collected. The processes used in the image formation process are applied to convert the correction data to the same state as the reverse transformed image. Specifically, for use with a polar format algorithm, this process is a data resampling in the slow-time dimension. In the present implementation, correction data is created on resampled grid coordinates in the fast-time dimension (of the phase history). This is accomplished by resampling the antenna pattern data in the frequency dimension to correspond to the frequency points used in polar format to provide an interpolated phase history $X''_{corr}$:

$$X''_{corr} = \text{resample}\left(\frac{Phase_{fac}}{Rng_{fac}Amp_{fac}}\right).$$

The interpolated corrections from Step 11 are applied to the phase history of the single pixel image $I''_{uc}$(Step 12). This step 12 is a multiplication of each element of the phase history, $X''_v$, with the same corresponding frequency and angle element of the interpolated phase history, $X''_{corr}$, of the single pixel:

$$X'''_v = X''_v \circ X''_{corr}.$$

The interpolated wavenumber domain data is converted back into an image (Step 13). This step 13 is a forward transformation, reversing Step 6. It creates a single pixel image with a corrected amplitude.

$$I''_c T\{X'''_v\}$$

The pixel value is replaced in the uncorrected image with the corresponding pixel value, $I''_c(x,y)$, in the image from Step 13. Then proceeding to the next pixel in the uncorrected image, steps 6-14 are repeated until all pixels are corrected (Step 14).

In an alternate embodiment, corrections are made just to the antenna beam pattern, which is particularly useful for long range SAR systems where the range differences between near and far edges of the SAR image do not have a large variance in RCS due to relative change in distance.

Figure 2:
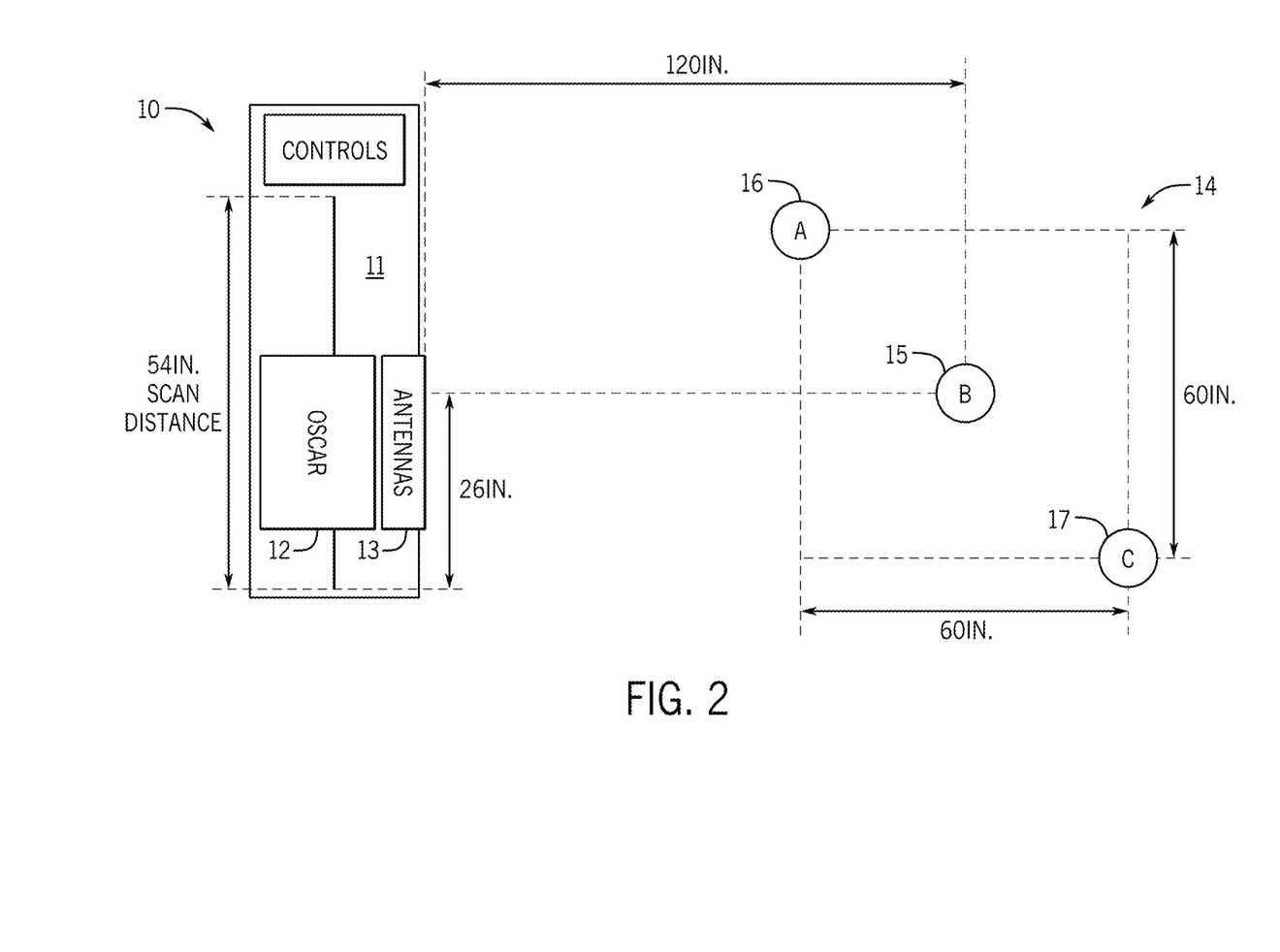
FIG. 2 is a diagram of a rail SAR system.

A rail SAR system was computer simulated to generate SAR data from a set of objects to test the precision and accuracy of the method of the present invention. FIG. 2 provides a diagram of the simulated rail SAR system 10. The SAR system 10 has a rail 11, an SAR 12, and SAR transmitting and receiving antennas 13. A scanned area 14 is shown as a rectangle having a center location 15, a near location 16, and a far location 17. SAR data is collected during constant motion of the SAR 12 across the rail 11 in a strip map SAR mode. The SAR 12 scans the area 14 to measure the radar cross-section (RCS) of objects located within that area.

Rail SAR Computer Simulations

Figure 3A:
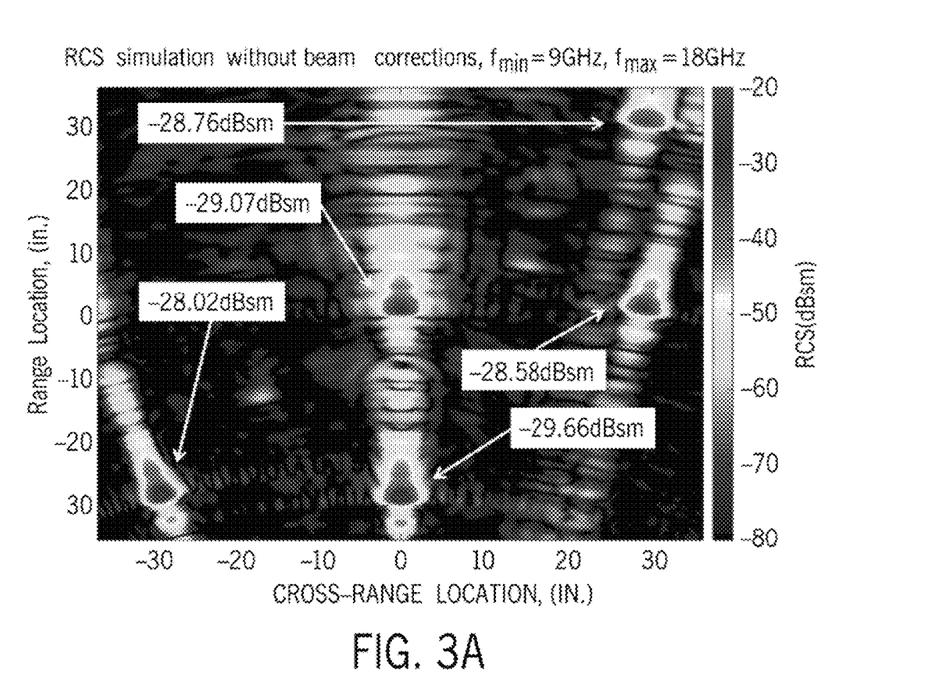
FIG. 3A shows an un-corrected SAR antenna beam pattern image obtained with rail SAR computer simulation of 1.5-inch diameter metal spheres.
Figure 3B:
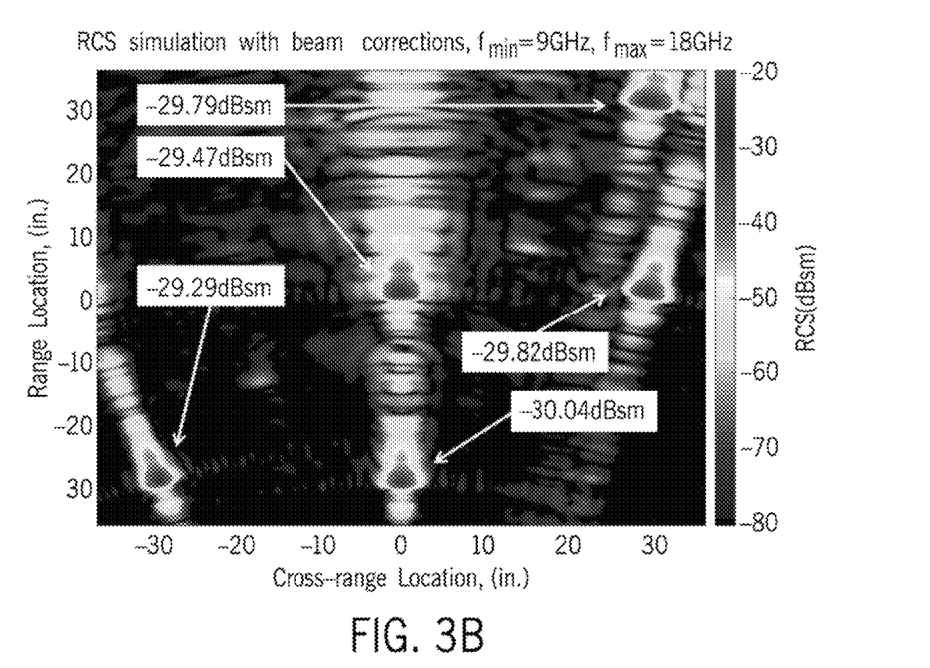
FIG. 3B shows the image of FIG. 3A after applying beam pattern correction.

A test case of five 1.5-inch diameter metal spheres was created using V-LOX electromagnetic software (IERUS Technologies, Inc., Huntsville, Alabama, www.ierustech.com. V-Lox is a computational electromagnetics prediction software product based on method of moments and leverages advanced matrix compression and GPU acceleration to output high quality solutions quickly.) The sphere targets were positioned at a near corner 16, near center, center 15, far center, and far corner 17 of a 5 ft-by-5 ft area centered at a point 10 ft away from the radar (center location 15 in FIG. 2). The simulation limited the frequency collection to 9-18 GHz to make a more interpretable image. The same antenna pattern used to create the data was also used for correction. FIG. 3A shows the un-corrected SAR image with range loss corrections after wavefront curvature correction and applying a Taylor window (nbar=4, SLL=−50 dB)). The target RCS values vary depending upon their position relative to the center of the image. The center target RCS is nearly correct, while targets at closer/farther ranges increasingly deviate from true RCS. FIG. 3B shows the image after applying beam pattern correction where the targets now vary within +/−0.5 dB of the true RCS. The true RCS of a 1.5-inch diameter sphere is −29.43 dBsm. The average uncorrected RCS was −28.82 dBsm and the average corrected RCS was −29.68 dBsm.

The computer simulations and SAR measurements show that the radar antenna beam pattern correction method of this invention improves the accuracy of measured RCS values by bringing the measured RCS values closer to true RCS values.

Figure 4:
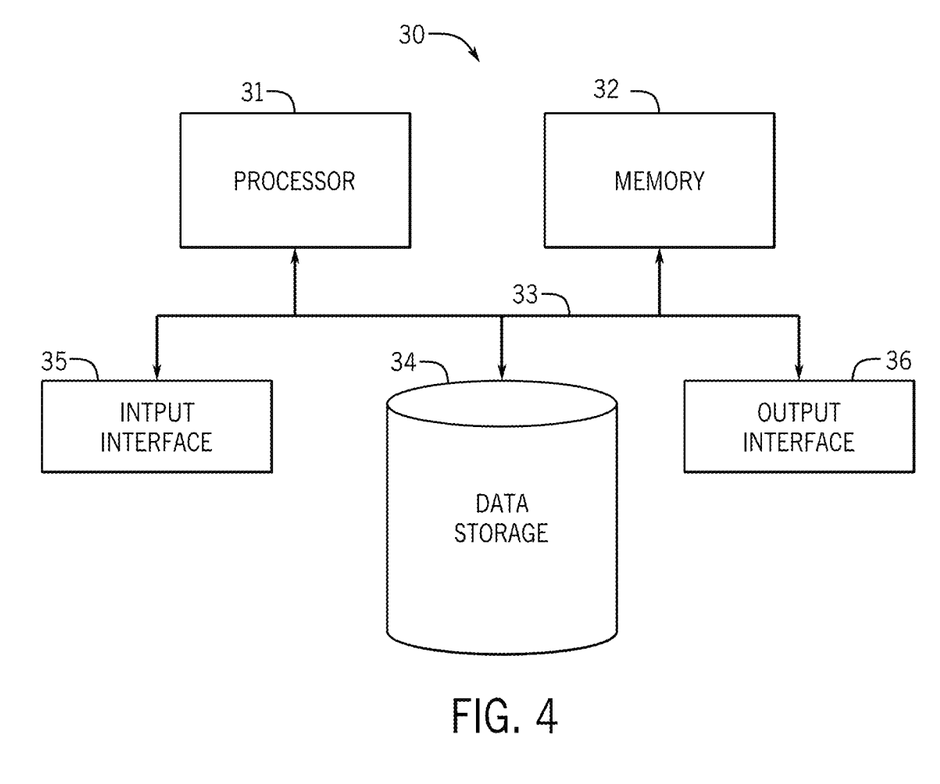
FIG. 4 illustrates an exemplary computing system that can be used in accordance with the systems and methodologies disclosed.

FIG. 4 illustrates an exemplary computing system 30 that can be used in accordance with the systems and methodologies disclosed. For example, the computing device 30 can be used to correct a synthetic aperture radar (SAR) antenna beam image as disclosed herein. The computing device 30 includes at least one processor 31 that executes instructions that are stored in a memory 32. The instructions may be, for instance, instructions for implementing functionality described as being carried out by one or more components discussed above or instructions for implementing one or more of the methods described above. The processor 31 may access the memory 32 by way of a system bus 33. In addition to storing executable instructions, the memory 32 may also store operating parameters, required algorithm software, and so forth.

The computing device 30 additionally includes a data store 34 that is accessible by the processor 31 by way of the system bus 33. The data store 34 may include executable instructions, operating parameters, etc. The computing device 30 also includes an input interface 35 that allows external devices to communicate with the computing device 30. For instance, the input interface 35 may be used to receive instructions from an external computer device, from a user, etc. The computing device 30 also includes an output interface 36 that interfaces the computing device 30 with one or more external devices. For example, the computing device 30 may display text, images, etc. by way of the output interface 36.

Additionally, while illustrated as a single system, it is to be understood that the computing device 30 may be a distributed system. Thus, for example, several devices may be in communication by way of a network connection and may collectively perform tasks described as being performed by the computing device 30.

The foregoing description illustrates and describes the disclosure. Additionally, the disclosure shows and describes only the preferred embodiments but, it is to be understood that the preferred embodiments are capable of being formed in various other combinations, modifications, and environments and are capable of changes or modifications within the scope of the invention concepts as expressed herein, commensurate with the above teachings and/or the skill or knowledge of the relevant art. The embodiments described herein above are further intended to explain the best modes known by applicant and to enable others skilled in the art to utilize the disclosure in such, or other, embodiments and with the various modifications required by the particular applications or uses thereof. Accordingly, the description is not intended to limit the invention to the form disclosed herein. Also, it is intended that the appended claims be construed to include alternative embodiments. It will be further understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A computer and software implemented method for correcting a synthetic aperture radar (SAR) antenna beam image, comprising:
   a) collecting SAR image data, including phase history and wave number domain, from an object;
   b) forming an uncorrected image $I_{uc}$ of the object from the SAR collected data using an invertible image formation algorithm;
   c) isolating a pixel value $I''_{uc}(x,y)$ from the uncorrected image $I_{uc}$, then inserting the isolated pixel value $I''_{uc}(x,y)$ into an image with all pixel values having a zero value except the isolated pixel value $I''_{uc}(x,y)$, thereby creating image $I''_{uc}$, performing an inverse image formation on the image $I''_{uc}$ to create a phase history $X''_v$ that represents only the isolated pixel value $I''_{uc}(x,y)$ from the image $I''_{uc}$;
   d) detecting the location of the isolated pixel value $I''_{uc}(x,y)$ relative to a reference point and calculating an actual isolated pixel value location $S'_x/S'_y$, based on detected isolated pixel value location in the uncorrected image $I_{uc}$;
   e) computing range loss corrections for the isolated pixel value $I''_{uc}(x,y)$, based on a range to actual pixel location;
   f) computing antenna beam pattern corrections for the isolated pixel value $I''_{uc}(x,y)$ based on frequency and angle to a measurement location at every SAR sampling position;
   g) calculating phase corrections for the isolated pixel value $I''_{uc}(x,y)$ using an image formation algorithm;
   h) interpolating range loss corrections, antenna beam pattern corrections, and phase corrections into an interpolated phase history $X''_{corr}$ according to the image formation algorithm of Step g);
   i) applying the interpolated phase history, $X''_{corr}$, to the phase history $X''_v$ forming a corrected phase history $X'''_v$ representing $I''_{uc}$;
   j) reversing step c) by transforming the corrected phase history $X'''_v$ into a corrected image $I''_c$;
   k) replacing a corresponding uncorrected pixel value $I_{uc}(x,y)$ in the uncorrected image $I_{uc}$ with a corrected isolated pixel value $I''_c(x,y)$ from the corrected image $I''_c$; and
   l) Repeating steps c) through l) until all uncorrected pixel values in the uncorrected image $I_{uc}$ are replaced with corrected pixel values from image $I''_c$, thereby providing a corrected SAR image of the object.

2. The computer and software implemented method of claim 1, further comprising, in step b), forming the uncorrected image $I_{uc}$ using a forward transformation from the phase history of the SAR collected data.

3. The computer and software implemented method of claim 1, wherein, in step c), the step of converting the isolated pixel value $I''_{uc}(x, y)$ into a phase history $X''_v$ comprises reverse transforming the image $I''_{uc}$ into the phase history $X''_v$.

4. The computer and software implemented method of claim 1, further comprising, in step d), calculating the pixel location of the isolated pixel value $I''_{uc}(x,y)$ as the number of pixels the isolated pixel value $I''_{uc}(x,y)$ is distant from the reference point, multiplying the number of pixels by pixel spacing, and estimating the actual pixel location $(S_x', S_y')$ of the isolated pixel value $I''_{uc}(x,y)$.

5. The computer and software implemented method of claim 1, further comprising, in step e), calculating range loss using a radar range equation.

6. The computer and software implemented method of claim 1, further comprising, in step f), calculating an antenna beam factor correction $Amp_{fac}$ for the isolated pixel value $I''_{uc}(x,y)$ and applying the antenna beam factor correction to the isolated pixel value $I''_{uc}(x,y)$ on a per-pulse basis.

7. The computer and software implemented method of claim 1, further comprising, in step g), calculating phase corrections for the isolated pixel value $I''_{uc}(x,y)$ in the phase history $X''_v$ based on the SAR position as the SAR collected data from the object.

8. The computer and software implemented method of claim 1, further comprising, in step i), correcting the amplitude of the corrected image $I''_c$.

9. A computer and software implemented method for correcting a synthetic aperture radar (SAR) antenna beam image, comprising:
   a) collecting SAR image data, including phase history and wave number domain, from an object;
   b) forming an uncorrected image $I_{uc}$ of the object from the SAR collected data using an invertible image formation algorithm, forming the uncorrected image using a forward transformation from the phase history of the SAR collected data;
   c) isolating a pixel value $I''_{uc}(x,y)$ from the uncorrected image $I_{uc}$, then inserting the isolated pixel value $I''_{uc}(x,y)$ into an image with all pixel values having a zero value except the isolated pixel value $I''_{uc}(x,y)$, thereby creating image $I''_{uc}$, performing an inverse image formation on the image $I''_{uc}$ to create a phase history $X''_v$ that represents only the isolated pixel value $I''_{uc}(x,y)$) from the image $I''_{uc}$;
   d) detecting the location of the isolated pixel value $I''_{uc}(x,y)$ relative to a reference point and calculating an actual isolated pixel value location $S_x', S_y'$, based on detected isolated pixel value location in the uncorrected image $I_{uc}$, calculating the pixel location of the isolated pixel value $I''_{uc}(x,y)$ as the number of pixels the isolated pixel value $I''_{uc}(x,y)$ is distant from the reference point, multiplying the number of pixels by pixel spacing, and estimating the actual pixel location $(S_x', S_y')$ of the isolated pixel value $I''_{uc}(x,y)$;
   e) computing range loss corrections for the isolated pixel value $I''_{uc}(x,y)$, based on a range to actual pixel location;
   f) computing antenna beam pattern corrections for the isolated pixel value $I''_{uc}(x,y)$ based on frequency and angle to a measurement location at every SAR sampling position;
   g) calculating phase corrections for the isolated pixel value $I''_{uc}(x,y)$ using an image formation algorithm;
   h) interpolating range loss corrections, antenna beam pattern corrections, and phase corrections in an interpolated phase history $X''_{corr}$ according to the image formation algorithm of Step g);
   i) applying the interpolated phase history $X''_{corr}$ to the phase history $X''_v$ forming a corrected phase history $X'''_v$;
   j) reversing step c) by transforming the corrected phase history $X'''_v$ into a corrected image $I''_c$;
   k) replacing a corresponding uncorrected pixel value $I_{uc}(x,y)$ in the uncorrected image $I_{uc}$ with a corrected isolated pixel value $I''_c(x,y)$ from the corrected image $I''_c$; and
   l) Repeating steps c) through l) until all uncorrected pixel values in the uncorrected image $I_{uc}$ are replaced with corrected pixel values from image $I''_c$, thereby providing a corrected SAR image of the object.

10. The computer and software implemented method of claim 9, further comprising, in step e), calculating range loss using a radar range equation.

11. The computer and software implemented method of claim 9, further comprising, in step f), calculating an antenna beam pattern correction $Amp_{fac}$ for the isolated pixel value $I''_{uc}(x,y)$ and applying the antenna beam pattern correction to the isolated pixel value $I''_{uc}(x,y)$ on a per-pulse basis.

12. The computer and software implemented method of claim 9, further comprising, in step g), calculating phase corrections for the isolated pixel value $I''_{uc}(x,y)$ in the phase history $X''_v$ based on the SAR position as the SAR collected data from the object.

13. The computer and software implemented method of claim 9, further comprising, in step i), correcting the amplitude of the corrected image $I''_c$.

14. A computer and software implemented method for correcting a synthetic aperture radar (SAR) antenna beam image, comprising:
   a) collecting SAR image data, including phase history and wave number domain, from an object;
   b) forming an uncorrected image Luc of the object from the SAR collected data using an invertible image formation algorithm, forming the uncorrected image using a forward transformation from the phase history of the SAR collected data;
   c) isolating a pixel value $I''_{uc}(x,y)$ from the uncorrected image $I_{uc}$, then inserting the isolated pixel value $I''_{uc}(x,y)$ into an image with all pixel values having a zero value except the isolated pixel value $I''_{uc}(x,y)$, thereby creating image $I''_{uc}$, performing an inverse image formation on the image $I''_{uc}$ to create a phase history $X''_v$ that represents only the isolated pixel value $I''_{uc}(x,y)$ from the image $I''_{uc}$;
   d) detecting the location of the isolated pixel value $I''_{uc}(x,y)$ relative to a reference point and calculating actual isolated pixel value location $S_x', S_y'$, based on detected isolated pixel value location in the uncorrected image $I_{uc}$, calculating the pixel location of the isolated pixel value $I''_{uc}(x,y)$ as the number of pixels the isolated pixel value $I''_{uc}(x,y)$ is distant from the reference point, multiplying the number of pixels by pixel spacing, and estimating the actual pixel location $(S_x', S_y')$ of the isolated pixel value $I''_{uc}(x,y)$;
   e) computing range lost corrections for the isolated pixel value $I''_{uc}(x,y)$, based on a range to actual pixel location, and calculating range loss based on a radar range equation;
   f) computing antenna beam pattern corrections for the isolated pixel value $I''_{uc}(x,y)$ based on frequency and angle to a measurement location at every SAR sampling position, calculating a range factor correction $Amp_{fac}$ for the isolated pixel, and applying the range factor correction to the isolated pixel on a per-pulse basis;
   g) calculating phase corrections for the isolated pixel value $I''_{uc}(x,y)$ using an image formation algorithm;

h) interpolating range loss corrections, antenna beam pattern corrections, and phase corrections into an interpolated phase history $X''_{corr}$ according to the image formation algorithm of Step g) and calculating phase corrections for the isolated pixel value $I''_{uc}(x,y)$ in the phase history domain based on the SAR position as the SAR collected data from the object;

i) applying the interpolated phase history, $X''_{corr}$, to the phase history $X''_v$ forming a corrected phase history $X'''_v$ representing $I''_{uc}(x,y)$;

j) reversing step c) by converting the corrected phase history $X'''_v$ into a corrected image $I''_c$;

k) replacing a corresponding uncorrected pixel value $I_{uc}(x,y)$ in the uncorrected image $I_{uc}$ with a corrected isolated pixel value $I''_c(x,y)$ from the corrected image $I''_c$); and l) Repeating steps c) through l) until all uncorrected pixel values in the uncorrected image $I_{uc}$ are replaced with corrected pixel values from image $I''_c$, thereby providing a corrected SAR image of the object.

15. The computer and software implemented method of claim 14, further comprising, in step i), correcting the amplitude of the corrected image $I''_c$.

16. A computer and software implemented method for correcting a synthetic aperture radar (SAR) antenna beam image, comprising:

a) collecting SAR image data, including phase history and wave number domain, from an object;

b) forming an uncorrected image $I_{uc}$ of the object from the SAR collected data using an invertible image formation algorithm;

c) isolating a pixel value $I''_{uc}(x,y)$ from the uncorrected image $I_{uc}$, then inserting the isolated pixel value $I''_{uc}(x,y)$ into an image with all pixel values having a zero value except the isolated pixel value $I''_{uc}(x,y)$, thereby creating image $I''_{uc}$, performing an inverse image formation on the image $I''_{uc}$ to create a phase history $X''_v$ that represents only the isolated pixel value $I''_{uc}(x,y)$ from the image $I''_{uc}$;

d) detecting the location of the isolated pixel value $I''_{uc}(x,y)$ relative to a reference point and calculating an actual isolated pixel value location $S_x'S_y'$, based on detected isolated pixel value location in the uncorrected image $I_{uc}$;

e) computing antenna beam pattern corrections for the isolated pixel value $I''_{uc}(x,y)$ based on frequency and angle to a measurement location at every SAR sampling position;

f) interpolating antenna beam pattern corrections into an interpolated phase history $X''_{corr}$ using an image formation algorithm;

g) applying the interpolated phase history, $X''_{corr}$, to the phase history $X''_v$ forming a corrected phase history $X'''_v$ representing $I''_{uc}$;

h) reversing step c) by transforming the corrected phase history $X'''_v$ into a corrected image $I''_c$;

i) replacing a corresponding uncorrected pixel value $I_{uc}(x,y)$ in the uncorrected image $I_{uc}$ with a corrected isolated pixel value $I''_c(x,y)$ from the corrected image $I''_c$; and j) repeating steps c) through i) until all uncorrected pixel values in the uncorrected image $I_{uc}$ are replaced with corrected pixel values from image $I''_c$, thereby providing a corrected SAR image of the object.

17. The computer and software implemented method of claim 16, further comprising, in step b), forming the uncorrected image $I_{uc}$ using a forward transformation from the phase history of the SAR collected data.

18. The computer and software implemented method of claim 17, wherein, in step c), the step of performing an inverse image formation on the image $I''_{uc}$ to create a phase history $X'_v$ comprises reverse transforming the pixel image $I''_{uc}$ into the phase history $X''_v$.

19. The computer and software implemented method of claim 18, further comprising, in step d), calculating the pixel location of the isolated pixel value $I''_{uc}(x,y)$ as the number of pixels the isolated pixel value $I''_{uc}(x,y)$ is distant from the reference point, multiplying the number of pixels by pixel spacing, and estimating the actual pixel location $(S_x'S_y')$ of the isolated pixel value $I''_{uc}(x,y)$.

20. The computer and software implemented method of claim 19, further comprising, in step g), correcting the amplitude of the corrected image $I''_c$.

* * * * *